United States Patent [19] [11] 3,978,451
Ito et al. [45] Aug. 31, 1976

[54] CONTROLLING COMMUNICATIONS BETWEEN COMPUTER DEVICES OVER COMMON BUS

[75] Inventors: Roy Atsushi Ito, Woodland Hills; Gary Arthur Jones, Canoga Park, both of Calif.

[73] Assignee: RCA Corporation, New York, N.Y.

[22] Filed: Apr. 21, 1975

[21] Appl. No.: 569,860

[52] U.S. Cl. ............................ 340/147 LP; 340/155; 340/167 R
[51] Int. Cl.² .......................................... H04Q 9/00
[58] Field of Search .......... 340/147 R, 147 LP, 150, 340/167 R, 151, 152, 155; 179/2 CA, 2 DP, 15 A

[56] References Cited
UNITED STATES PATENTS 3,796,992   3/1974   Nakamura et al. ............ 340/147 LP
3,832,689   8/1974   Means et al. ................... 340/147 LP
3,863,220   1/1975   Osawa et al. ................... 340/147 LP

*Primary Examiner*—Donald J. Yusko
*Attorney, Agent, or Firm*—Edward J. Norton; Carl V. Olson

[57] ABSTRACT

A system for controlling communications between a plurality of computer devices via a common bus. The bus includes a multi-conductor data bus and lines for busy, strobe and acknowledge signals. The system involves one universal interface unit associated with each respective computer device. Each device can initiate access to the common bus, through its respective interface unit, on a first-come, first-served basis.

4 Claims, 8 Drawing Figures

CONTROLLING COMMUNICATIONS BETWEEN COMPUTER DEVICES OVER COMMON BUS

BACKGROUND OF THE INVENTION

There are many systems for controlling the initiation and termination of communications between computer units or devices over a common bus. Some systems permit devices to initiate use of the bus solely during repeating time periods assigned to the respective devices. Some systems assign different priorities to different devices, and permit devices to initiate use of the bus in order of priority without waiting for an assigned time period. The prior arrangements involve an undersirably large amount of control equipment and procedures, such as may be included in and provided by a computer connected to the bus.

SUMMARY OF THE INVENTION

A simple, efficient, high-speed system for controlling communications over a bus includes means whereby any device can act through a respective interface unit to obtain access to the common bus without involving any other device in the process. Once a device gains access to the bus it can communicate with any other device on the bus. The direction of data transfer can change any number of times without an interruption of the bus connection.

DETAILED DESCRIPTION OF THE PREFERRED EMBODIMENT

Figure 1:
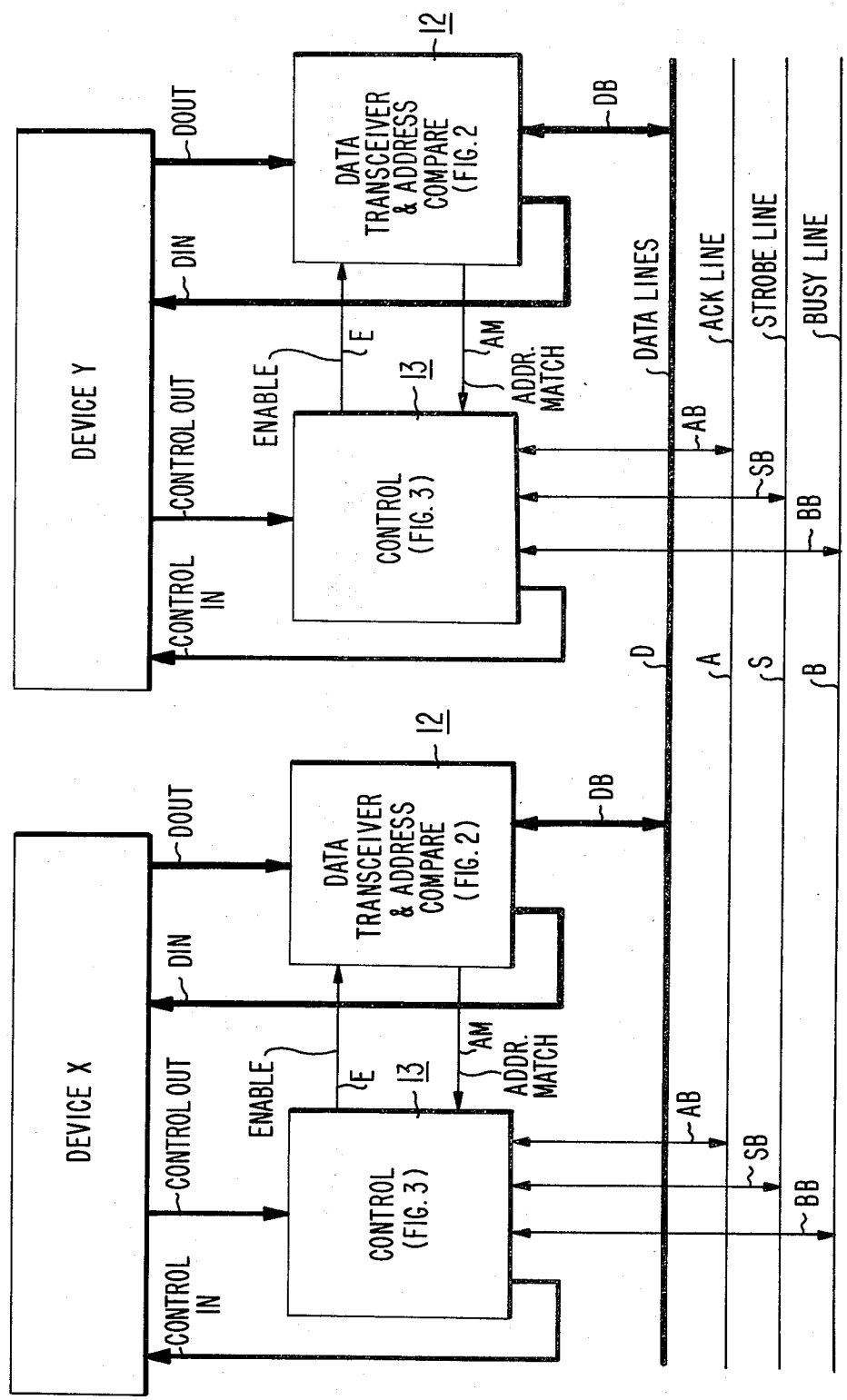
FIG. 1 is a block diagram of a system constructed according to the teachings of the invention.

FIG. 1 shows only two of many devices X and Y, each of which may be connected through a respective interface unit or bus controller to a common bus. The bus includes eight data lines D, an acknowledge line A, a strobe line S and a busy line B. Each interface unit includes a data transceiver and address comparator unit 12 shown in detail in FIG. 2, and a control unit 13 shown in detail in FIG. 3. Each unit 12 is connected with the corresponding device by eight data in lines DIN, and eight data out lines DOUT, and is connected with the data lines D of the common bus by data bus lines DB. An address match line AM extends from unit 12 to unit 13, and an enable line E extends from unit 13 to unit 12.

Figure 3:
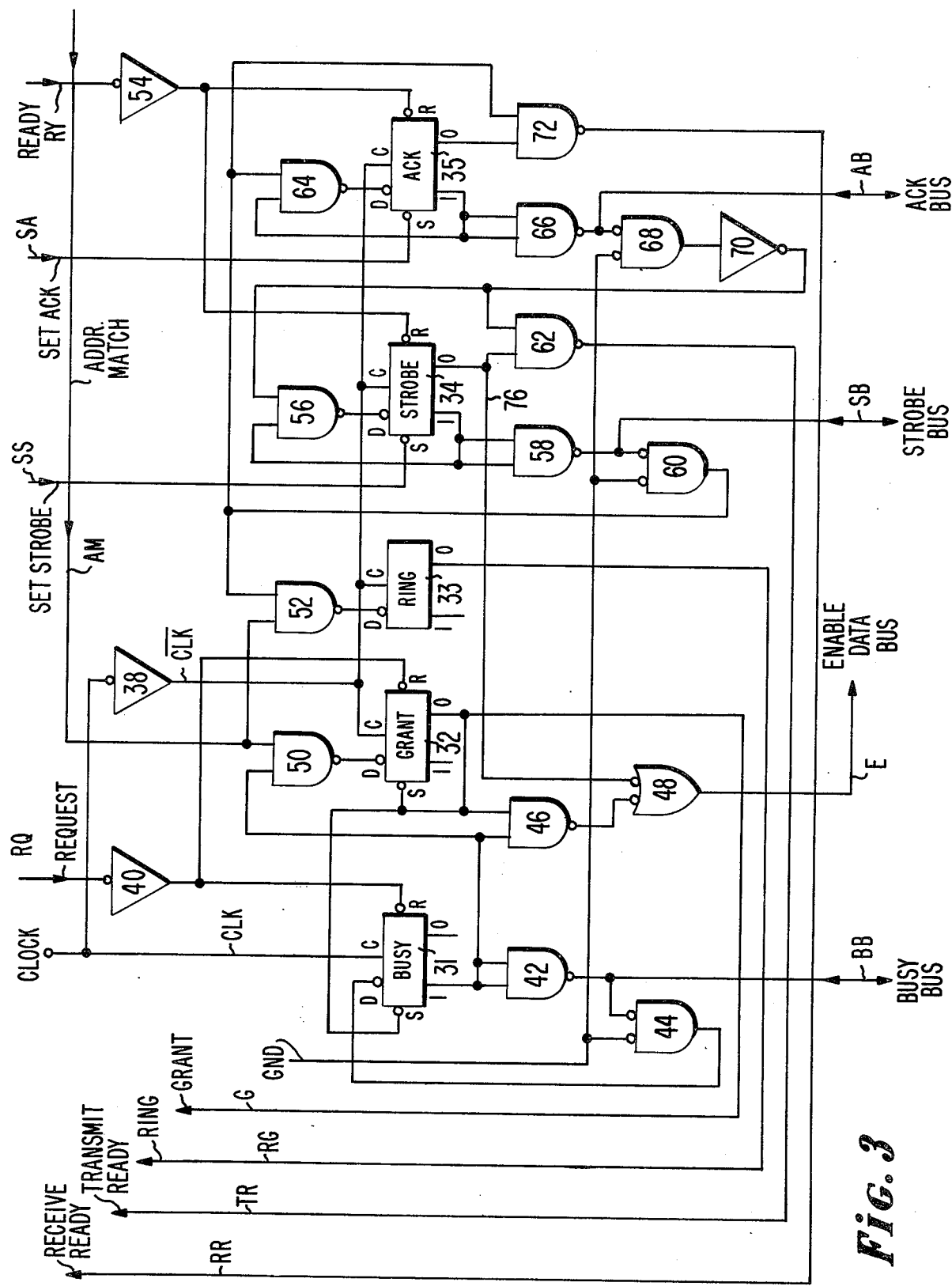
FIG. 3 is a circuit diagram of the data transceiver and address comparison portion of units in FIG. 1.

Control OUT lines in FIG. 1 to a control unit 13 from a device are shown in FIG. 3 to consist of a request line RQ, a set strobe line SS, a set acknowledge line SA and a ready line RY. Control IN lines in FIG. 1 from a control unit 13 to a device are shown in FIG. 3 to consist of a receive ready line RR, a transmit ready line TR, a ring line RG, and a grant line G. Lines in FIG. 1 between a control unit 13 and the bus consist of a busy bus line BB to the busy line B, a strobe bus line SB to the strobe line S, and an acknowledge bus line AB to the acknowledge line A.

Figure 2:
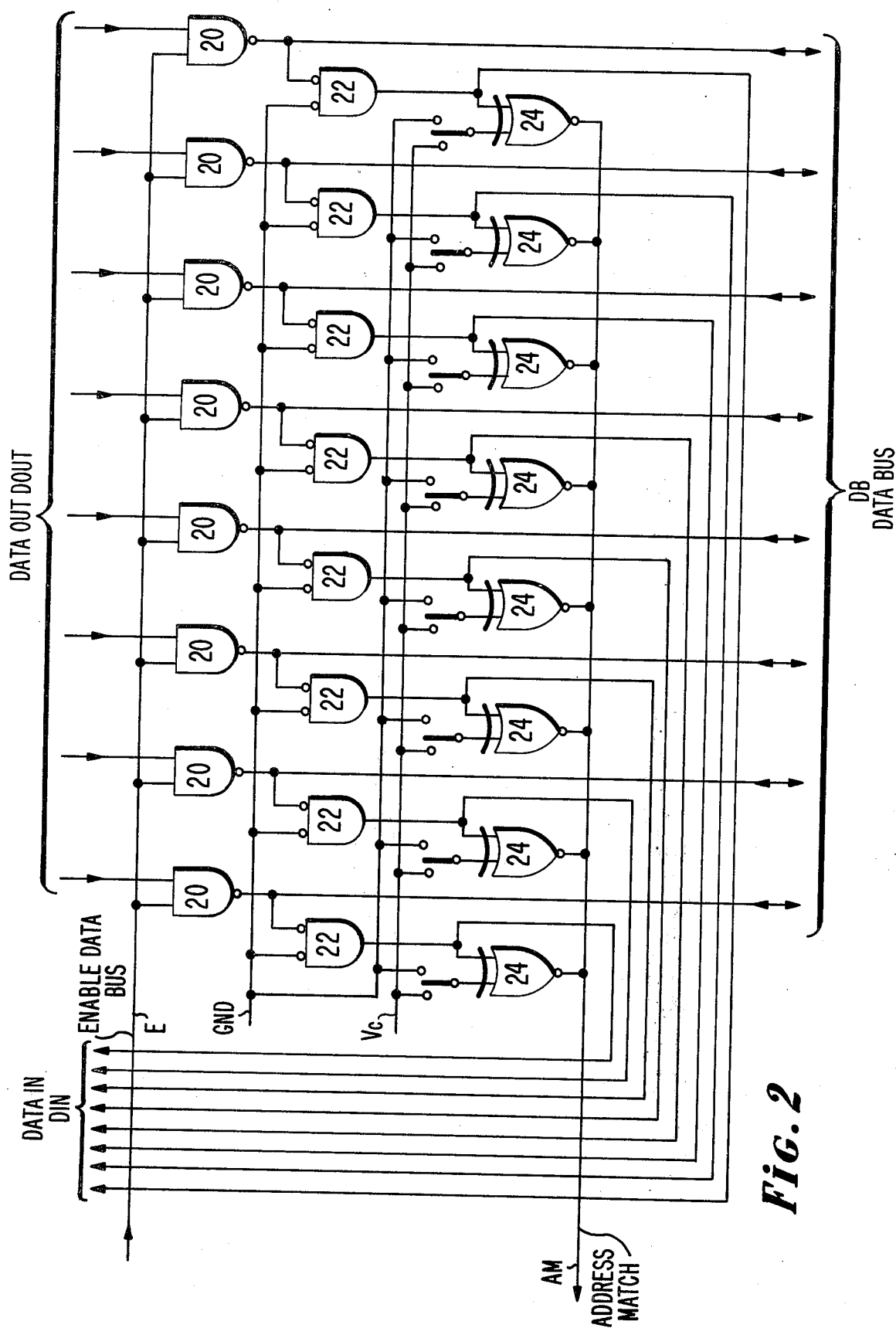
FIG. 2 is a circuit diagram of the control portion of units in FIG. 1.

The data transceiver unit 12 shown in FIG. 2 includes eight "nand" gates 20 for connecting data out lines DOUT from a device through eight data bus lines DB to the eight data lines D of the common bus. The gates 20 are enabled by an enabling signal from control unit 13 on enable line E. Unit 12 also includes eight continuously-enabled "and" gates 22 for continuously connecting the eight data bus lines DB to the device through the eight data in lines DIN. The eight gates 22 also have outputs to inputs of eight respective exclusive "nor" gates 24. Each of the eight gates 24 has another input permanently connected to either a "1" logic level over line $V_c$ or a "0" logic level over ground potential line GND. The pattern of the connections to the gates 24 are such as to uniquely identify the particular associated device X or Y. When the data lines D of the common bus and the data bus lines DB carry the address of the particular device and are applied to one input of the gates 24 which always receive the self-address on the other input, an address match output signal is produced on address match line AM and conveyed to the control unit 13.

The control unit 13 shown in detail in FIG. 3 includes five flip-flops 31–35 which are conventional D-type flip-flops each having a set input S, a reset input R, a clock-controlled input D, a clock input C, a "1" output and an inverted or "0" output. The clock inputs C of all flip-flops are provided with a clock signal CLK or an inverted clock signal $\overline{CLK}$ through inverter 38 from a clock source (not shown).

A "busy" flip-flop 31 has its set input S connected to the "1" output of "grant" flip-flop 32, has its reset input R connected through an inverter 40 to the request line RQ of the associated device, and has its "1" output connected through gate 42 and busy bus line BB to the busy line B of the common bus, and also connected through gate 44 back to its D input.

A "grant" flip-flop 32 has its set input S connected to its "1" output, has its reset input R connected through an inverter 40 to the request line RQ of the associated device, has a D input connected through a gate 50 from the address match line AM from unit 12, has its "1" output connected through gates 46 and 48 to the line E for enabling the data transfer gates 20 in FIG. 2, and has a "0" output to the grant line G going to the device.

A "ring" flip-flop 33 has a D input connected through a gate 52 from the address match line AM, and has a "0" output to the ring line RG going to the device.

A "strobe" flip-flop 34 has a set input S connected with the set strobe line SS from the device, has a reset input R connected through an inverter 54 from the ready line RY from the device, has a "1" output connected through a gate 56 to its D input, and connected through gate 58 and the strobe bus line SB to the strobe line of the common bus and through gate 60 to gate 52, and has its "0" output connected through gate 62 to the transmit ready line TR going to the device.

An acknowledge flip-flop 35 has its set input S connected to the set acknowledge line SA from the device, its reset input R connected through inverter 54 with the ready line RY from the device, has its "1" output connected through gate 64 to its D input and through gate 66 and the acknowledge bus line AB to the acknowledge line A of the common bus, and through gate 68 and inverter 70 to gates 56 and 62, and has its "0" output connected through gate 72 to the receive ready line RR to the device.

OPERATION

The operation of the system including interface units or bus controllers 12, 13 is divided into four functions: bus access, bus response, data transmission and data reception.

Bus Access.

When the device is not using or initiating the bus access, the request line RQ is high, making the output at inverter 40 low and holding the flip-flops 31 and 32 reset. Gate 42 is disabled since the flip-flop 31 is reset and the interface unit is not generating the Bus Busy BB signal.

Figure 4A:
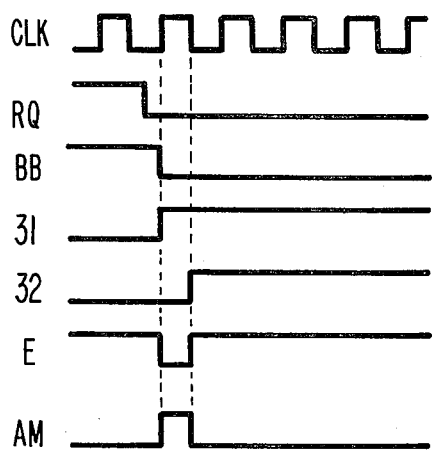
FIGS. 4A to 4C are charts of bus access voltage waveforms.

The bus access operation is initiated by a device which sends its own device address on its data out lines DOUT to unit 12 (FIG. 2) and sends a request signal on line RQ to the control unit 13 (FIG. 3). FIG. 4A shows the waveforms on clock line CLK, request line RQ, busy bus line BB, busy flip-flop 31, grant flip-flop 32, enable data bus E and address match line AM. The request signal RQ is applied through inverter 40 to discontinue the reset signal to busy flip-flop 31. This causes the flip-flop 31 to be set at the time of the next positive transition of the clock signal on line CLK to the input C of the flip-flop if Bus Busy line BB is high (meaning no device is using the bus) and making output of gate 44 low. If BB is low, flip-flop 31 will remain reset until the BB becomes high. When the flip-flop 31 is set, its "1" output acting through gate 42 causes a bus busy signal to be sent over line BB to the busy line B of the common bus. Also, since flip-flop 32 is still reset, the "1" output of flip-flop 31 acting through gates 46 and 48 causes an enable data bus signal to pass over line E to the gates 20 in FIG. 2. The enabled gates 20 pass eight data bit signals from the device through eight data bus lines DB to the eight data lines D of the common bus. The device and interface controller have now put a bus busy signal on the busy bus B, and the device's own address on data lines D of the common bus. The address now on the data bus D is applied through gates 22 to the address comparator gates 24. If the information on the bus matches the address stored by switch connections at the inputs to the gates 24, an address match signal is generated on line AM and is supplied to unit 13 (FIG. 3).

When the flip-flop 31 was set, its "1" output was also connected to prime gate 50. Gate 50 is then enabled by the address match signal received over line AM, and the output of the gate primes the D input of the grant flip-flop 32. The grant flip-flop 32 is then set at the next negative transition of the clock signal applied to the clock input C of the flip-flop. The setting of grant flip-flop 32 results in a signal from the "0" output of the flip-flop over grant line G back to the device to indicate that the bus access sequence is complete. When the grant flip-flop is set, its "0" output also acts over line 74 to jam the busy flip-flop 31 and the grant flip-flop 32 to the set state. It also terminates the enable data bus signal E by disabling gate 46.

Figure 4B:
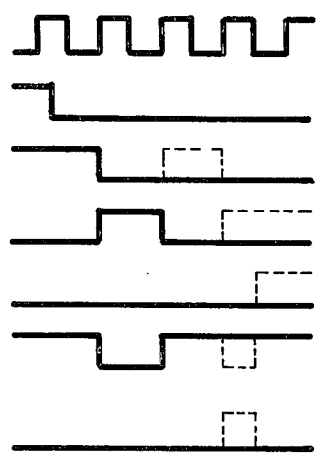

The operation when the device is not successful in accessing the bus is illustrated by the waveforms of FIG. 4B. The grant flip-flop 32 is not set unless there is an address match signal on line AM from unit 12 at the time of the negative transition of the clock. If there is some data on the bus other than the address of the device seeking access, there is no address match signal and the bus access will not be made. In this case, the busy flip-flop 31 is not held in the set state by flip-flop 32 and is reset by the clock, causing the removal of the busy bus signal through gate 42 and busy bus line BB to the busy line B of the common bus. The enable data bus signal from gates 46 and 48 to line E is also terminated so that there is no connection for data from the device through gates 20 in FIG. 2 to the common bus. If the request signal is still received over line RQ from the device, the bus access cycle is repeated until setting of flip-flops 31 and 32 is effected. This is illustrated by the dotted line portion of the waveforms of FIG. 4B.

Figure 4C:
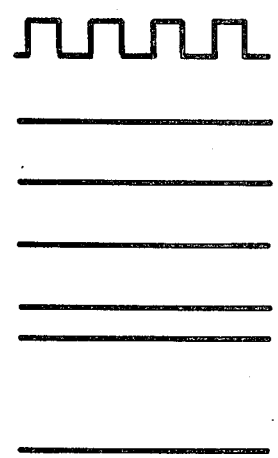

This operation occurs only when more than two devices on the bus are initiating the bus access simultaneously. FIG. 4C shows the waveforms when access to the bus is unsuccessful because the bus is busy. A bus busy low signal on busy line B of the common bus applied over bus busy line BB and gate 44 to the D input of the busy flip-flop 31 prevents the reset flip-flop from being switched to its set state.

Bus Response.

The bus response function is the response of a device to being called by another device. This occurs when the bus controller for a called device receives the device address and receives a strobe from the strobe line B. The matching address generates the address match signal on line AM which is applied to gate 52, and the strobe signal is applied through gate 60 to gate 52. The gate 52 is enabled and its output is applied to the ring flip-flop 33, which sends a ring signal over line RG to the device. The device is thus notified that it is being called by another device on the line.

Data Transmission.

Once the access sequence is complete, the device initiating the sequence responds to receipt of a grant signal on line G by transmitting the address code of the other device it wants to communicate with through enabled gates 20 (FIG. 2) and lines DB to the data lines D of the common bus.

Figure 5A:
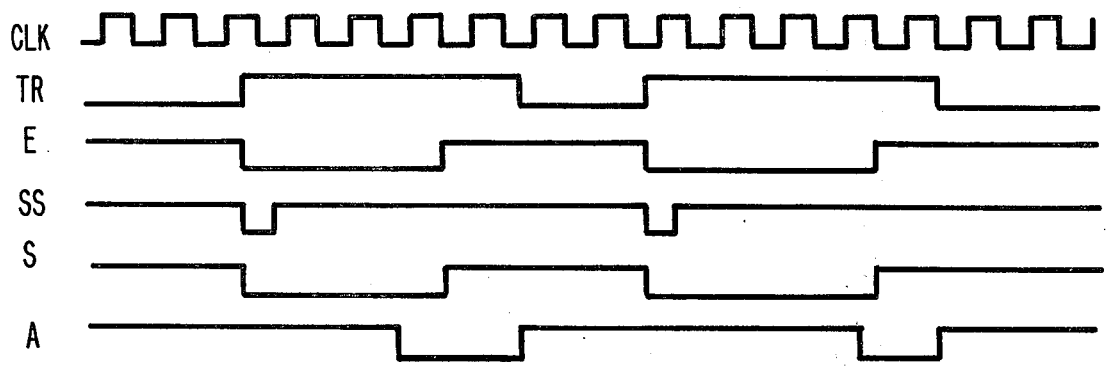
FIGS. 5A; 5B are charts of data transfer voltage waveforms.
Figure 5B:
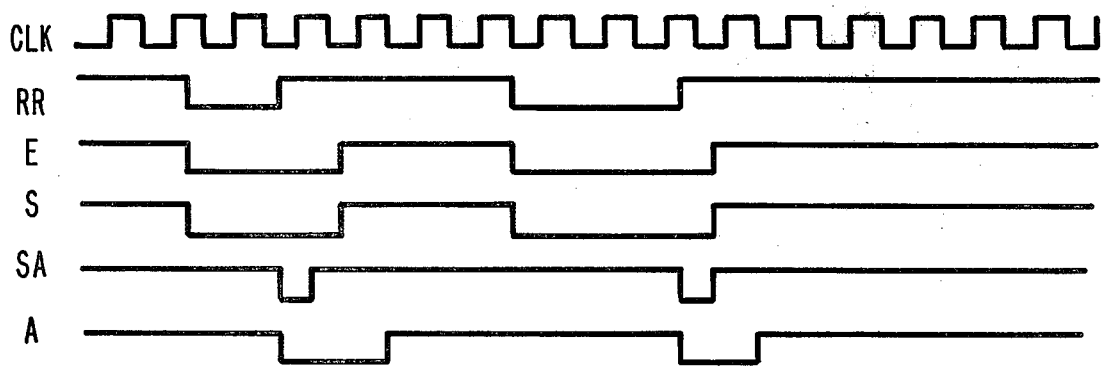

When a byte (8 bits) of data is to be transmitted over the common bus to another device, the ready signal on line RY from the device must be "on" and the transmit ready signal on line TR from gate 62 should be "on". (See waveforms of FIG. 5A). The device then sends a set strobe pulse over line SS to set the strobe flip-flop 34, which acts through gate 58 to apply a strobe bus signal over line SB to the strobe line S of the common bus. The setting of strobe flip-flop 34 also acts over line 76 and through gate 48 to send an enable data bus signal over line E to gates 20 in unit 12 of FIG. 2. The gates 20 are thus enabled and the byte of data is sent from the device to the common bus.

The setting of the strobe flip-flop 34 also acts through gate 62 to discontinue the transmit ready signal previously sent over line TR to the device. When an acknowledge signal is received from the other device over the acknowledge line A of the common bus and the line AB, the signal acts through gate 68, inverter 70 and gate 56 to reset the strobe flip-flop 34 at the next negative transition of the clock signal. When the acknowledge signal ends, the effect coupled through gate 68, and inverter 70 to the gate 62 is to send a transmit ready signal over line TR to the device so that the cycle of transmitting a byte of data can be repeated.

Data Reception.

A byte of data is ready on the bus (transmitted from the other device) when the Receive Ready signal is on line RR from the bus controller gate 72. The Ready signal on line RY must be "on" so that the acknowledge flip-flop 35 is not jammed to the reset state all the time. The receive ready signal is generated when the strobe is received from the strobe bus line SB and the strobe line S on the common bus. The receiver gate 60 enables gate 72 and sends the receiver ready signal on RR to the device. The device will then read the data through data in line DIN received through gates 22, and will generate the Set Ack signal on SA which sets the acknowledge flip-flop 35. The "1" output of flip-flop 35 is sent through gate 66, Ack bus AB and Ack line A of the common bus to the transmitting device. The "1" output of the flip-flop 35 is also fed back to the D input of the flip-flop through gate 64 to hold the flip-flop in the set state. When the transmitting device receives the acknowledge signal, it turns off the strobe signal on the SB line which disables the gate 64 through receiver gate 60. At the next negative transition of the clock, the acknowledge flip-flop 35 is reset terminating the acknowledge signal on line AB.

The cycle is repeated when the strobe signal is received on strobe bus line SB from the transmitting device.

What is claimed is:

1. A system for controlling communications between a plurality of devices via a common bus which includes a multi-conductor data bus, and a "busy" bus, comprising a plurality of interface units each associated with a respective device, each interface unit including a data transceiver for transferring data between the respective device and the data bus, an address recognizer providing an "address match" output signal when receptive to an address from the respective device and said data bus which matches the address of the respective device, means including a "busy" flip-flop responsive to a bus access "request" signal from the respective device, and to the absence of a busy signal on the busy bus, to put a busy signal on the busy bus, and to enable the data transceiver to connect the address of the respective device to the data bus, and means including a "grant" flip-flop responsive to an address match signal from said address recognizer to supply a "grant" signal to the respective device to signal the seizing of the bus by the respective device, and to continue the supplying of a busy signal to the busy bus from said "busy" flip-flop.

2. A system according to claim 1 wherein said means including a "grant" flip-flop also includes means to disable the data transceiver connection of the device address to the data bus.

3. A system according to claim 2, and in addition, clock means by which events are made to occur at predetermined times, so that the bus access "request" signal can be continued until the absence of a busy signal on the busy bus, and the presence of an "address match" signal, permits the seizing of the bus by the requesting device.

4. A system according to claim 3 wherein said address recognizer consists of gates each having one input wired according to the respective device address, and having another input coupled to the data bus.

* * * * *